(12) United States Patent
Novack et al.

(10) Patent No.: US 7,356,475 B2
(45) Date of Patent: Apr. 8, 2008

(54) SYSTEM AND METHOD FOR PROVIDING ACCESS TO AN INTERACTIVE SERVICE OFFERING

(75) Inventors: Brian M. Novack, St. Louis, MO (US); Hisao M. Chang, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 168 days.

(21) Appl. No.: 10/751,685

(22) Filed: Jan. 5, 2004

(65) Prior Publication Data

US 2005/0147218 A1    Jul. 7, 2005

(51) Int. Cl.
  *G10L 15/22* (2006.01)
  *G10L 15/00* (2006.01)

(52) U.S. Cl. ...................... 704/275; 704/251

(58) Field of Classification Search ............ 704/270.1, 704/246, 270; 370/375.5, 310; 710/11; 379/88.1, 102.02, 231
See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 5,335,269 A | 8/1994 | Steinlicht | |
| 5,455,903 A | 10/1995 | Jolissaint et al. | |
| 5,497,373 A * | 3/1996 | Hulen et al. | 370/259 |
| 5,522,046 A | 5/1996 | McMillen et al. | |
| 5,530,744 A | 6/1996 | Charalambous et al. | |
| 5,555,299 A | 9/1996 | Maloney et al. | |
| 5,590,186 A | 12/1996 | Liao et al. | |
| 5,652,789 A | 7/1997 | Miner et al. | |
| 5,754,639 A | 5/1998 | Flockhart et al. | |
| 5,754,978 A | 5/1998 | Perez-Mendez et al. | |
| 5,923,745 A | 7/1999 | Hurd | |

(Continued)

FOREIGN PATENT DOCUMENTS

EP    0 424 015 A2    4/1991

(Continued)

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/lg/index.

(Continued)

*Primary Examiner*—Tàlivaldis Ivars Smits
*Assistant Examiner*—Myriam Pierre
(74) *Attorney, Agent, or Firm*—Toler Schaffer LLP

(57) ABSTRACT

A system and method are disclosed for providing access to an interactive service offering. A method incorporating teachings of the present disclosure may include receiving a first communication in a format that complies with a first protocol. The first communication may be associated with a desired interaction between a first device and a voice activated service (VAS) platform. The method may also include receiving a second communication in a different format that complies with a different protocol, and the second communication may also be associated with a desired interaction between a different device and the VAS platform. A system implementing the method may recognize that the VAS platform does not support the first protocol, and translate the first communication to a platform-supported format to facilitate the desired interaction.

21 Claims, 3 Drawing Sheets

U.S. PATENT DOCUMENTS

| | | | |
|---|---|---|---|
| 5,940,476 A | 8/1999 | Morganstein et al. | |
| 5,946,388 A | 8/1999 | Walker et al. | |
| 5,953,704 A | 9/1999 | McIlroy et al. | |
| 5,999,965 A | 12/1999 | Kelly | |
| 6,002,689 A * | 12/1999 | Christie et al. | 370/401 |
| 6,002,760 A | 12/1999 | Gisby | |
| 6,003,011 A | 12/1999 | Sarin et al. | |
| 6,049,594 A | 4/2000 | Furman et al. | |
| 6,118,866 A | 9/2000 | Shtivelmann | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 * | 1/2001 | Gilbrech | 713/153 |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | |
| 6,570,967 B2 | 5/2003 | Katz | |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 * | 9/2003 | Elliott et al. | 370/352 |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,963,983 B2 | 11/2005 | Munson et al. | |
| 7,006,605 B1 | 2/2006 | Morganstein et al. | |
| 7,035,388 B2 | 4/2006 | Kurosaki et al. | |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 * | 6/2002 | Crain et al. | 370/352 |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 | 2/2003 | Bushey et al. | |
| 2003/0035381 A1 * | 2/2003 | Chen et al. | 370/261 |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 * | 6/2003 | Haller et al. | 455/41 |
| 2003/0118159 A1 * | 6/2003 | Shen et al. | 379/88.04 |
| 2003/0130864 A1 | 7/2003 | Ho et al. | |
| 2003/0143981 A1 | 7/2003 | Kortum et al. | |
| 2003/0144846 A1 * | 7/2003 | Denenberg et al. | 704/277 |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth et al. | |
| 2003/0202640 A1 | 10/2003 | Knott et al. | |
| 2003/0202643 A1 | 10/2003 | Joseph et al. | |
| 2003/0202649 A1 | 10/2003 | Haug et al. | |
| 2003/0204435 A1 | 10/2003 | McQuilkin et al. | |
| 2003/0235287 A1 | 12/2003 | Margolis et al. | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0120473 A1 * | 6/2004 | Birch et al. | 379/88.17 |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |

| | | |
|---|---|---|
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015744 A1 | 1/2005 | Bushey et al. |
| 2005/0018825 A1 | 1/2005 | Ho et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novak et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2006/0018443 A1 | 1/2006 | Knott et al. |
| 2006/0023863 A1 | 2/2006 | Joseph et al. |
| 2006/0026049 A1 | 2/2006 | Joseph et al. |
| 2006/0036437 A1 | 2/2006 | Bushey et al. |
| 2006/0039547 A1 | 2/2006 | Klein et al. |
| 2006/0050865 A1 | 3/2006 | Konum et al. |
| 2006/0062375 A1 | 3/2006 | Pasquale et al. |
| 2006/0072737 A1 | 4/2006 | Paden et al. |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0153345 A1 | 7/2006 | Bushey et al. |
| 2006/0159240 A1 | 7/2006 | Bushey et al. |
| 2006/0161431 A1 | 7/2006 | Sabourin et al. |
| 2006/0177040 A1 | 8/2006 | Mitra et al. |
| 2006/0188087 A1 | 8/2006 | Kortum et al. |
| 2006/0215831 A1 | 9/2006 | Knott et al. |
| 2006/0215833 A1 | 9/2006 | Dallesandro et al. |
| 2006/0291642 A1 | 12/2006 | Bushey et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

Dan Whitecotton, et al., System and Method of Managing Calld to a Custom Call Service Center, U.S. Appl. No. 11/200,870, filed Aug. 10, 2005.

Jeffrey L. Brandt, et al., System and Method of Managing Incoming Telephone Calls at a Call Center, U.S. Appl. No. 11/214,451, filed Aug. 29, 2005.

Jeffrey L. Brandt, et al., System and Method of Managing Calls at a Call Center, U.S. Appl. No. 11/267,593, filed Nov. 4, 2005.

Benjamin A. Knott, et al., System and Method for Routing Calls, U.S. Appl. No. 11/005,498, filed Dec. 6, 2004.

Philip T. Kortum, et al., System and Method for On Hold Caller-Controlled Activities and Entertainment, U.S. Appl. No. 11/071,068, filed Mar. 3, 2005.

Robert R. Bushey, et al., System and Method for Determining Call Treatment of Repeat Calls, U.S. Appl. No. 11/129,051, filed May 13, 2005.

Robert R. Bushey, et al., Call Routing System and Method of Using the Same, U.S. Appl. No. 11/145,513, filed Jun. 3, 2005.

Robert R. Bushey, et al., System and Method of Automated Order Status Retrievel, U.S. Appl. No. 11/173,227, filed Jul. 1, 2005.

Benjamin A. Knott, et al., System and Method for Automated Performance Monitoring For a Call Servicing System, U.S. Appl. No. 11/176,972, filed Jul. 7, 2005.

Julie Idler, et al., System and Method to Access Content From a Speech-Enabled Automated System, U.S. Appl. No. 11/212,939, filed Aug. 25, 2005,

* cited by examiner

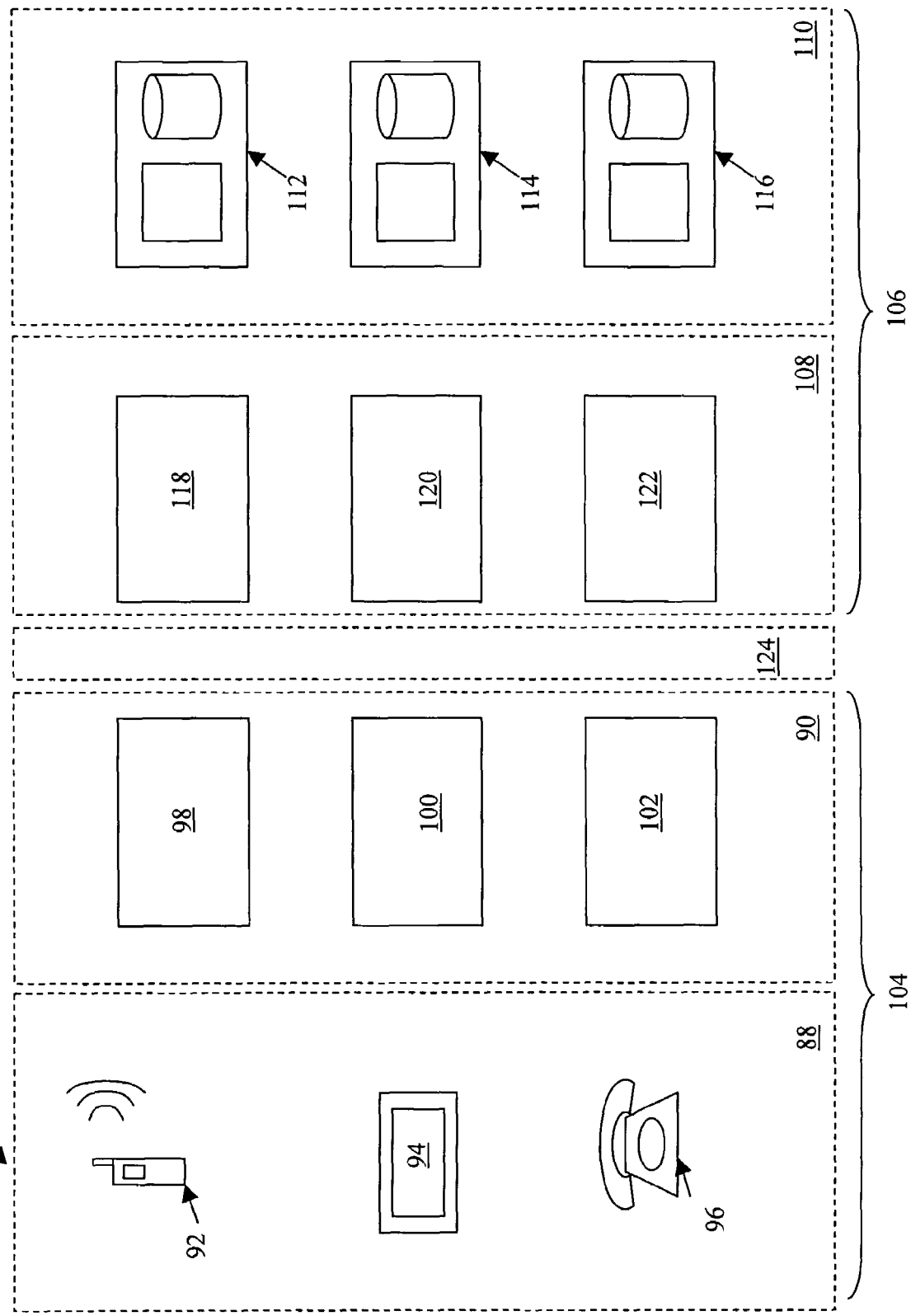

SYSTEM AND METHOD FOR PROVIDING ACCESS TO AN INTERACTIVE SERVICE OFFERING

FIELD OF THE INVENTION

The present disclosure relates generally to the provisioning of interactive services, and more specifically to a system and method for providing access to an interactive service offering.

BACKGROUND

Voice activated service (VAS) offerings often employ some technique for providing requestors with interactive and voice-based access to information. One relatively common technique involves an interactive voice response (IVR) application. A typical IVR application includes software for accepting voice telephone inputs or touch-tone keypad selections from a requestor. In response, the application may provide the requestor with responsive information and/or effectuate a requestor command.

The goal of many IVR and IVR-like solutions is often to reduce the number of low value-add calls handled by actual agents. In theory, automating common interactions may provide an enhanced level of requestor satisfaction while reducing the average cost per call. In practice, many organizations presenting VAS offerings find the available VAS platforms to be ineffectual.

While speech recognition technologies have assisted in making traditional IVR applications more requestor-friendly, these solutions often require proprietary software, hardware, and interfaces—increasing implementation costs and tightly coupling the organization deploying the technology with the organization supplying the technology. This combined with complex integration requirements and limited interoperability has helped make application development costly, slow, and rigid.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 3 shows a block diagram of various components that may be employed in a system incorporating teachings of the present disclosure.

DETAILED DESCRIPTION OF THE DRAWINGS

Embodiments discussed below describe, in part, the provisioning of voice activated services (VAS) in a technology and protocol flexible manner. From a high level, a system incorporating teachings of the present disclosure may effectively create an abstraction layer between a requestor interface and a VAS or other interactive service offering. While the requestor interface may "understand" or be capable of communicating with a given requestor device, the service offering may employ a system or technology that does not "understand" the requestor device. In operation, the abstraction layer mentioned above may act as a translator—facilitating communication between the requestor device and the platform of the VAS offering.

A network-based VAS offering may be deployed on a vendor and/or technology specific platform. To interact with the deployed platform, a requestor may need to route communications through a tightly coupled requestor interface. The tight coupling may exist, for example, by virtue of some rigid and proprietary application interface requirements promulgated by the VAS platform. An abstraction layer that breaks this rigid platform/interface link may allow for lower cost, more flexible, and less rigid interactive service offerings.

An example technique incorporating teachings of the present disclosure may include receiving a first communication in a format that complies with a first protocol. The first communication may be associated with a desired interaction between a first device and a voice activated service (VAS) platform. The method may also include receiving a second communication in a different format that complies with a different protocol, and the second communication may also be associated with a desired interaction between a different device and the VAS platform. A system implementing the method may recognize that the VAS platform does not support the first protocol, and translate the first communication to a platform-supported format to facilitate the desired interaction.

Figure 1:
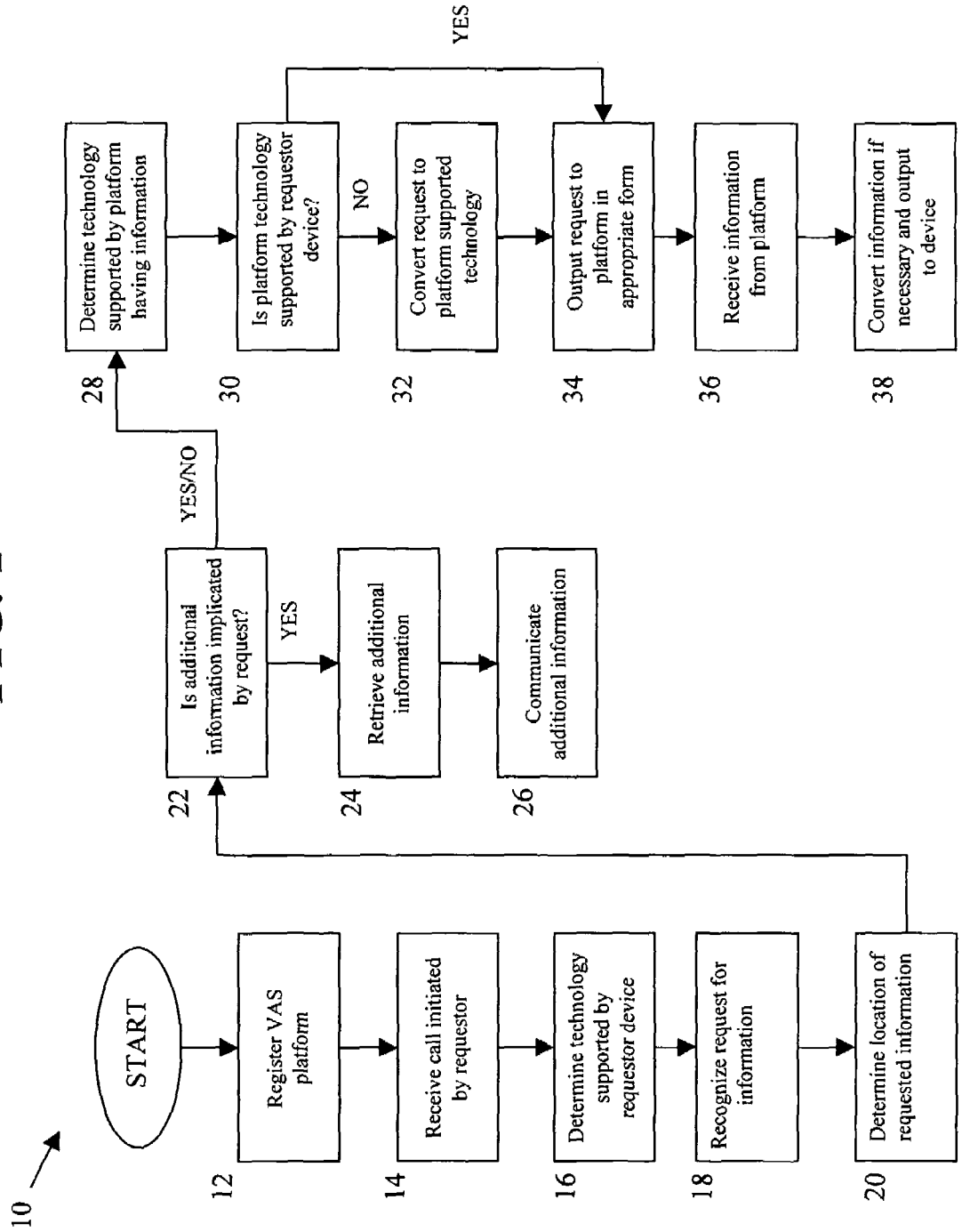
FIG. 1 presents a flow diagram for providing flexible interconnection between disparate requestors and disparate VAS platforms in accordance with the teachings of the present disclosure.

As mentioned above, FIG. 1 presents a flow diagram for providing flexible interconnection between disparate requestors and disparate VAS platforms in accordance with the teachings of the present disclosure. As shown, technique 10 may begin and, at step 12, a VAS platform may be registered. Registering a platform may be an automated process and/or a more manual process. In some systems, an administrator may be able to remotely register a platform. For example, an administrator may be presented with a graphical user interface (GUI) at a remote location. The administrator may interact with the GUI to effectuate the creation or registration of one or more platforms. An administrator may effectively "tell" a system implementing technique 10 that a VAS platform being registered provides a specific interactive service and supports one or more communication protocols.

The interactive services may or may not be voice-enabled. The services may, for example, provide information like directory assistance, voice-based web browsing, regional information like weather and traffic alerts, some other types of information, and/or a combination thereof. The supported protocols may include, for example, Voice over Internet Protocol (VoIP) communications, TCP/IP, traditional telephony or Plain Old Telephony Service (POTS) communications, protocols associated with the Public Switched Telephone Network (PSTN), other communication-related protocols and formats, and/or combinations thereof. Through the supported protocols, the services can receive and process the request expressed in form of standards-based scripting languages such as HTML, extensible Markup Language (XML), VoiceXML, hybrids of eXtensible HTML (xHTML) and VoiceXML like (X+V), Speech Application Language Tag (SALT), and/or combinations thereof.

At step 14, a system implementing technique 10 may receive a call initiated by a requestor. The requestor may be remote or local. In some embodiments, the requestor may be a device making automated requests for information. The requestor may also be a remote end user employing an electronic communication device to interact with a network-based interactive service platform. The communication device may take several forms and may communicate information in formats that comply with one or more protocols. Communication devices may be implemented, for example, in wireless and cordless phones, personal digital assistants, cellular telephones, mobile telephones, laptop computers, desktop computers, mainframes, PSTN switches, Ethernet switches, routers, gateways, hardware, firmware, software, work stations, other options having some level of computing capability, and/or a combination thereof.

At step 16, a system implementing technique 10 may employ some methodology and/or engine for assessing what technology is supported by the requesting device. The system may, for example, recognize a supported protocol by considering the format of the incoming request. The system may also, at step 18, determine the information and/or the location of the information being requested. For example, a system implementing technique 10 may recognize that the requestor seeks directory information or some network-based data service information like stock quotes, account information, and/or help-line information. The system may recognize the type of information sought by actually considering the content of information received from the requestor, considering dialed digits, considering an addressee of the request, some other technique, and/or a combination thereof.

In response to determining the type of information requested, a system implementing technique 10 may access a memory maintaining a list of available and/or registered interactive service platforms. The list may indicate the type of information available at each of the platforms, and at step 20, the location of requested information may be determined.

At step 22, a determination may be made as to whether or not additional information is implicated by the request. For example, a given request may indicate a desire or need for information maintained in a memory remote from the interactive service platform. If additional information is desired, technique 10 may progress to step 24, where the additional information is retrieved. The additional information may take several forms and may be communicated to the requestor and/or to the platform. The additional information may be communicated at step 26 and may include information about the requestor, information about the platform, information about a third party, authentication information, authorization information, other information, and/or a combination thereof. In some embodiments, the communication may be in-band and/or out of band from an interaction between the requestor and the appropriate platform.

Whether or not additional information was desired and/or needed, technique 10 may progress to step 28. At step 28, a system implementing technique 10 may determine a technology or communication protocol supported by the platform serving the requested information. At step 30, the system may determine whether or not the platform-supported protocol is supported by the requestor device. If it is not, technique 10 may progress to step 32 and a connector may be employed to facilitate communication between the requestor device and the platform.

The connector may effectively form an abstraction layer between the requestor device and the platform. In some embodiments, this abstraction may be facilitated by an intermediary and/or generic protocol. For example, a request may come in having a format that complies with a first protocol, and the platform may communicate information in a format that complies with a different format. To effectuate communication between the requestor device and the platform, an intermediary protocol may be employed. The intermediary protocol may be one of the protocols natively supported by either the platform or the requestor device. It may also be a third protocol different than both the platform-supported protocol and the device protocol.

Technique 10 may eventually progress to step 34 and the request may be output to an appropriate platform. At step 36, information may be received from the platform and converted, if necessary, at step 38 into a format receivable by the requestor device. Various steps of technique 10 may be repeated in dialogues requiring additional interaction between a requestor device and a platform. Those skilled in the art will recognize that various steps of technique 10 could be implemented by a single server or computing platform, by a combination of devices, by hardware implementations, firmware implementations, software implementations, and/or combinations thereof.

For example, in one implementation, a computing platform may be able to read and execute computer-readable data to receive a voice communication having a first format, the communication associated with a desired interaction between a first device and a voice activated service (VAS) platform, to recognize that the VAS platform communicates voice information in a different format, and to effectuate the desired interaction by altering the voice communication to have the different format. A computer-readable medium storing the data may have additional computer-readable data to facilitate communication between a plurality of communication devices each communicating information in respective formats that comply with different protocols and a plurality of VAS platforms.

Figure 2:
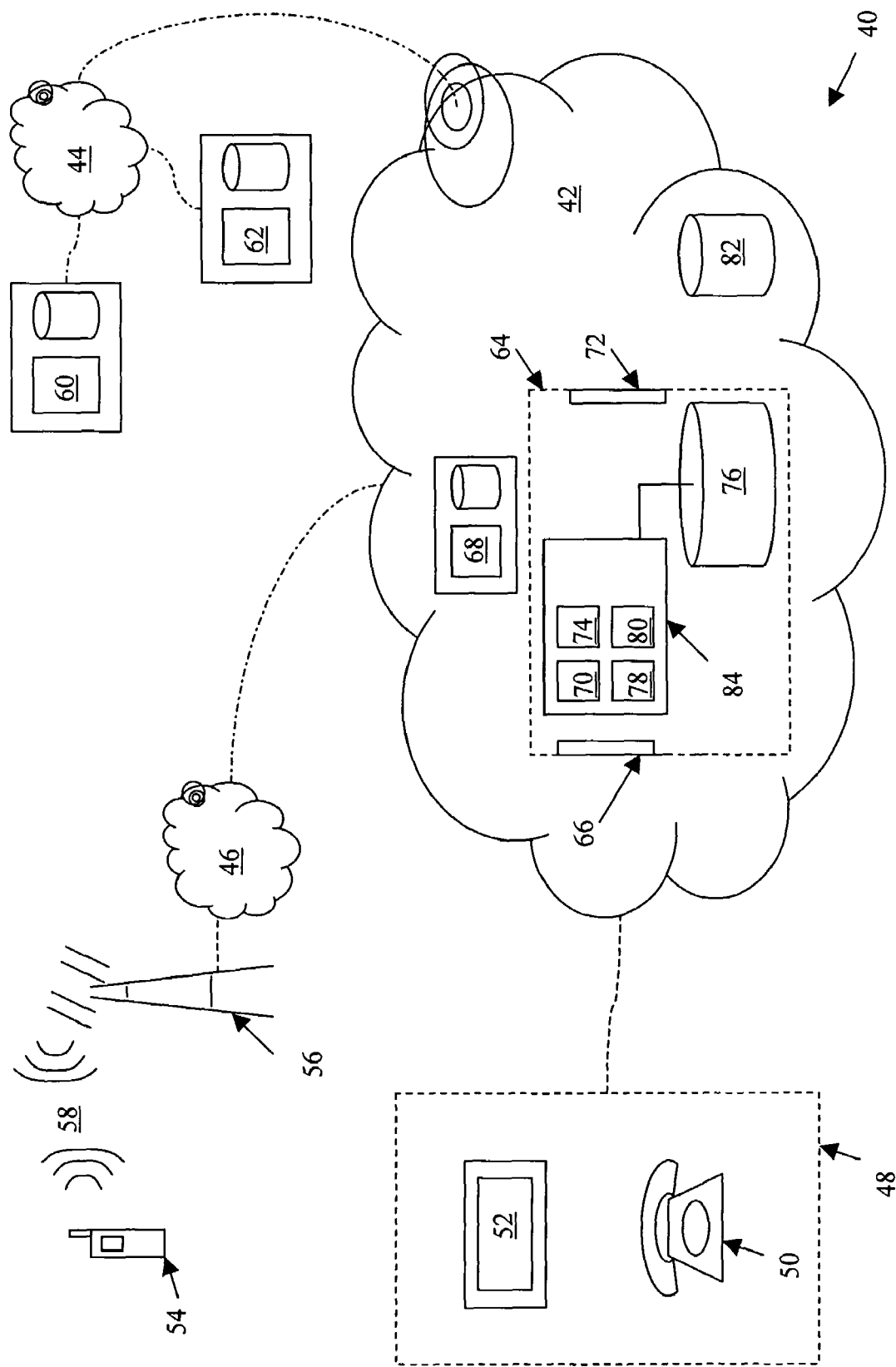
FIG. 2 shows one embodiment of a network implemented system that incorporates teachings of the present disclosure to interconnect end users and VAS providers.

As mentioned above, FIG. 2 shows an embodiment of a network implemented system 40 that incorporates teachings of the present disclosure to interconnect end users and VAS providers. As shown, system 40 include a PSTN 42, Public Internet 44, and a wireless or cellular network 46. Other networks and network types may also be incorporated into system 40. In operation, a user may interact with one or more of the depicted system elements from a variety of locations and using a variety of device types. For example, a user may be at customer premises 48 and attempting to access an interactive service platform using POTS telephone station 50 or connected computer 52. A user may also be mobile and using wireless communication device 54 to interconnect with network 46 via network node 56.

Communication between device 54 and node 56 may take several forms. As shown, wireless communication 58 may be a Radio Frequency (RF) communication. As such, device 54 may be capable of Radio Frequency communication that employs a 2.5 G mobile technology like GPRS or EDGE. Device 54 may also employ higher bandwidth offerings like 3 G/UMTS. In some embodiments, device 54 may communicate with node 56 using a short-range or local wireless technology like 802.11, Wi-Fi, Bluetooth, and/or some other technique.

In operation, a device like device 54 may issue what amounts to a request to access a remote interactive service platform, like remote platform 60 or 62, each connected to Public Internet 44. Platforms 60 and 62 may support business logic and may provide Voice Activated Service functionality to an end user or requestor. The functionality may include, for example, traditional telephony features found in a conventional IVR, enhanced applications like text-tospeech, speech-to-text, speech recognition, speaker identity enrollment/verification, voice-based web browsing other functionality, and/or combinations thereof.

Platforms 60 and 62 may support a various protocols, and those protocols may not be supported by device 54, telephone 50, and/or computer 52. As such, to facilitate communication between various platforms and various devices, a network service provider may elect to employ an access center, like center 64. As depicted, center 64 may be operating as a service bureau and may support users from different networks and platforms associated with different networks.

Center 64 may present users with a network interface 66, which may be capable of forming at least a portion of a link communicatively coupling a remote communication device, like device 54, and an interactive service offering platform, like network platform 68. In some embodiments, network interface 66 may include a telephony interface, an Integrated Voice Response interface, a Voice over Internet Protocol interface, and/or a Voice over Extensible Markup Language interface. In operation, a requestor device may engage one of these interfaces. The interface engaged may depend on the communication protocols supported by the requesting device. An interconnection engine 70 may recognize which interface of the network interface is engaged by the remote communication device. In response, the interconnection engine may output a signal indicating the communication protocol being used by the requestor device.

Center 64 may also include a platform interface 72, which may also be capable of forming at least a portion of a link communicatively coupling a remote communication device, like device 54, and an interactive service offering platform, like network platform 68. In some embodiments, platforms 60, 62, and 68 may communicate using different protocols. As such, like network interface 66, platform interface 72 may include various interface types to facilitate interconnection with the different platforms. The interface types may include, for example, a telephony interface, an Integrated Voice Response interface, a Voice over Internet Protocol interface, a Voice over Extensible Markup Language interface, and/or other interfaces.

As mentioned above, interconnection engine 70 may recognize which interface of network interface 66 is engaged by a communication device. A mapping engine 74 may recognize the type of service sought by the requestor and query a memory 76 to identify the platform or platforms providing such a service. Memory 76 may be maintaining information that indicates service types and/or supported protocols for the various interactive service offering platforms associated with center 64.

In some situations, the supported protocols of a given platform may not include the native protocol of a requesting device. In such a situation, an abstraction engine 78 may be capable of facilitating communication between the remote communication device and the interactive service offering platform. Abstraction engine 78 may "know" that the requestor device understands a first protocol and the platform understands a different protocol. Abstraction engine 78 may employ a multi-protocol connector to bridge between the appropriate interface of network interface 66 and platform interface 72. For example, a requestor device may only understand POTS-based communication formats, and a desired platform may be accessible through a VoIP interface. To facilitate communication between the two, abstraction engine 78 may employ a connector that translates between VoIP and POTS.

In some embodiments, the abstraction engine may make use of an intermediary protocol or format that differs from both POTS and VoIP. This intermediary may effectively act as a universal connector. In such an embodiment, communications associated with various interfaces of network interface 66 and platform interface 72 may be translated into a generic format and then back up into the desired format before being communicated to either the requestor device or the platform in their respective natively-supported formats.

Center 64 may also include a retrieval engine 80 to gather information from a remote repository 82 in response to a recognition that additional information is desired in connection with the communication between a remote communication device and an interactive service offering platform. It should be understood that the telephones, computers, devices, engines, servers, and/or platforms, described herein, may take several different forms and may be stand alone and/or incorporated into several different pieces of equipment, like laptop computers, desktop computers, telephones, mainframes, PSTN switches, Ethernet switches, routers, gateways, hardware, firmware, software, work stations, other options having some level of computing capability, and/or a combination thereof. For example, engines 70, 74, 78, and 80 could be independent applications, could be independent servers, could be executing on different platforms, and/or could be executing on a single platform like platform 84.

As mentioned above, FIG. 3 shows a block diagram of various components that may be employed in a system 86 incorporating teachings of the present disclosure. As depicted, end user devices 88 may interact with appropriate interfaces 90. As shown, end user devices may include wireless-enabled device 92, computing device 94, and POTS telephone 96. Appropriate interfaces may include IVR interface 98, VoIP enabled interface or client 100, and VoiceXML or X+V driven application interface 102. Other devices and interfaces may be employed in a system incorporating teachings of the present disclosure. The depicted components are illustrative examples.

In practice, devices 88 and interfaces 90 may make up the front-end portion 104 of system 86. The back-end portion 106 of system 86 may include platform interfaces 108 and platforms 110. Each of platforms 112, 114, and 116 may be accessible using one or more different protocols or communication formats. Communications directed to one or more of the platforms may pass through an interface capable of forming at least a portion of a communication link with a given platform. Platform interfaces 108 may include, for example, protocol or technology specific interfaces like telephony interface 118, Voice Over IP interface 120, and XML interface 122.

As shown, system 86 includes an abstraction layer 124, which may effectively act as a multi-protocol connector. Abstraction layer 124 may allow system 86 to interconnect many different types of devices communicating in many different formats with platforms supporting many different formats.

In an operational embodiment, device 94 may lack an audio interface capability (neither built-in microphone nor speaker) and may want to access some services. As such, device 94 may use interface 102 to submit the request. Through an abstraction layer 124, XML interface 120 may determine that the only interface available on the back-end portion 106 of system 86 is telephony interface 118 at the time of the request. Therefore, interface 120 should relay the request to interface 98 by forwarding necessary information such as digital files containing the previously recorded utterances necessary for the services. Upon receiving this information, interface 98 may make a telephony connection to the telephony connector 118 on the backend system on behalf of device 94. The audio output information from the services will be first received by the IVR interface 98 and then converted into text information. The text information may then be sent back to the XML interface 102 which may in turn send the textual information to device 94 for display.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A method of voice-based interaction comprising:
   receiving a first communication in a format that complies with a first protocol, the first communication associated with a desired interaction between a first device and a voice activated service (VAS) platform;
   receiving a second communication in a different format that complies with a different protocol, the second communication associated with an other desired interaction between a different device and the voice activated service (VAS) platform;
   recognizing that the VAS platform does not support the first protocol; and
   translating the first communication, but not the second communication, to a platform-supported format to facilitate the desired interaction in response to the recognition that the VAS platform does not support the first protocol.

2. The method of claim 1, further comprising:
   receiving a third communication, the third communication associated with an additional interaction between a third device and a different voice activated service (VAS) platform; and
   facilitating the additional interaction.

3. The method of claim 2, further comprising maintaining a list of formats supported by the VAS platform and the different VAS platform.

4. The method of claim 3, further comprising maintaining an information store comprising mapping information that identifies a service offering associated with the VAS platform and a different service offering associated with the different VAS platform.

5. The method of claim 1, wherein the platform-supported format comprises a packetized call format that complies with a Voice Extensible Markup Language (VoiceXML) format.

6. The method of claim 5, wherein the first communication comprises analog voice signals.

7. The method of claim 6, further comprising routing the first communication to the voice activated service (VAS) platform via a connector operable to facilitate information exchange between a VoiceXML device and an analog telephony device.

8. The method of claim 7, further comprising:
   receiving a third communication, the third communication associated with a device interaction between a third device and a different voice activated service (VAS) platform; and
   routing the third collection of communication information to the different voice activated service (VAS) platform via a different connector operable to facilitate information exchange between a VoIP device and an analog telephony device.

9. The method of claim 1, wherein the first communication is received via a network selected from the group consisting of a Public Switched Telephone Network (PSTN), a private Time Division Multiplexed (TDM) network, a wide area wireless network, a network supporting VoIP, an intranet, and extranet, and a managed Internet Protocol (IP) network.

10. A method of providing multi-protocol access to a network-based service offering, comprising:
    receiving a first request for access to a network-based interactive service, the first request having a format for communication via a Public Switched Telephone Network (PSTN);
    receiving a second request fur access to a different network-based interactive service, the second request having a different format for communication via a public Internet Protocol (IP) network;
    identifying a platform capable of offering the network-based interactive service;
    routing the first request to the platform;
    identifying a different platform capable of offering the different network-based interactive service; and
    routing the second request to the different platform.

11. The method of claim 10, further comprising:
    recognizing that the platform does not support the format; and
    initiating translation from the format into a platform-supported format.

12. The method of claim 10, further comprising:
    retrieving information associated with the first request; and
    communicating the information.

13. The method of claim 12, wherein the information comprises information about an initiator of the first request, further wherein communicating the information comprises sending the information to the platform.

14. The method of claim 13, wherein the information comprises Caller Identification (Caller ID) information.

15. The method of claim 12, wherein the information comprises information implicated by the first request, further wherein communicating the information comprises sending the information to an initiator of the first request.

16. The method of claim 11, further comprising accessing a multi-protocol connector to interconnect an initiator of the first request and the platform.

17. The method of claim 16, wherein the multi-protocol connector is operable to facilitate communication between a plurality of different request formats and a plurality of different platform-supported formats.

18. A computer-readable medium having computer-readable data to facilitate a voice communication having a first format, the communication associated with a desired interaction between a first device and a voice activated service (VAS) platform, to recognize that the VAS platform communicates voice information in a different format, and to effectuate the desired interaction by altering the voice communication to have the different format.

19. The computer-readable medium of claim 18, further comprising computer-readable data to facilitate communication between a plurality of communication devices each communicating information in respective formats that comply with different protocols and a plurality of VAS platforms.

20. The method of claim 1, wherein before receiving the first communication, the method further comprises registering VAS platforms as capable of supporting at least one protocol and at least one interactive service.

21. The method of claim 20, wherein recognizing that the VAS platform does not support the first protocol comprises identifying a VAS platform to perform the desired interaction via the first protocol based on the registration of VAS platforms.

* * * * *